United States Patent Office 3,495,939
Patented Feb. 17, 1970

3,495,939
MANUFACTURE OF DENSE BODIES OF SILICON CARBIDE
Christopher William Forrest, Preston, England, assignor to United Kingdom Atomic Energy Authority, London, England
No Drawing. Filed May 29, 1967, Ser. No. 642,153
Claims priority, application Great Britain, June 10, 1966, 26,094/66
Int. Cl. C01b 31/36
U.S. Cl. 23—208                                6 Claims

ABSTRACT OF THE DISCLOSURE

A body comprising a coherent mixture of finely divided silicon carbide and carbonaceous materials which is to be heated in contact with molten silicon so as to effect reaction between the silicon and the carbonaceous material by infiltration of silicon through porosity in the body is first heated in an atmosphere of silicon monoxide vapour which reacts directly with the carbonaceous material in the outer layers of the body. By this means, the porosity in the outer layers of the body is increased to enhance the rate of impregnation of the body by silicon.

BACKGROUND OF THE INVENTION

This invention relates to the production of high density silicon carbide bodies.

In one process for the production of bodies of silicon carbide a body comprising a coherent mixture of finely divided alpha silicon carbide and carbon is heated under vacuum in contact with molten silicon metal so as to effect reaction between the silicon and the carbon in the body. The body is stood substantially vertically with its lower end in contact with the molten silicon which infiltrates the body by capillary action. An exothermic reaction, producing beta silicon carbide, takes place between the silicon and the carbon in the body at a reaction front which moves up the body as silicon is drawn up the body by capillary action. In order to allow for infiltration of the body by silicon under capilllary action the body must contain a certain amount of porosity. The silicon reacts with the carbon in the body to produce beta silicon carbide which bonds the original alpha silicon carbide grains of the body together. A greater volume of beta silicon carbide is produced than the volume of the carbon consumed. However, to allow for complete siliconisation of the body, it is necessary to ensure that the porosity present in the original body is not completely filled by the beta silicon carbide which is formed. In general, the amounts of carbon and porosity in the original body are chosen such that 8–12 volume percent of porosity remains in the body after siliconisation. This porosity is filled with silicon. For reasons of mechanical strength etc. it is undesirable that the siliconised body should contain more than about this amount of free silicon. Hence the amount of porosity which can be present in the body before siliconisation and which affect the rate of silicon infiltration, is governed by the need to limit the amount of free silicon which is present in the siliconised body. The porosity in the bulk of the body cannot be increased to enhance the rate of silicon infiltration as this would result in a siliconised body containing more than the desirable amount of free silicon.

Also, although an extruded body can be produced having a required amount of porosity throughout its bulk, such a body generally has an outer layer of higher density material which will contain less porosity than is required for efficient operation of the siliconisation process. The outer layer of the body will be of high density because of the high forces exerted on the material at the face of the die as the material is extruded. Because the high density outer layer of such a body is of low porosity the infiltration of this region of the body by silicon under capillary action will be less efficient and the consequent reduction in the rate of silicon infiltration up the outer layers of the body will inhibit the rate of silicon infiltration up the centre of the body.

Even if siliconisation of such a body is achieved a further drawback arises from the fact that the siliconised body contains free silicon in the residual porosity. Molten silicon is of higher density and hence occupies a smaller volume than the equivalent weight of solid silicon. On cooling of a siliconised body from the reaction temperature to room temperature the free silicon in the body on solidifying therefore increases in volume and the excess silicon exudes from the body at its surface. In the case of a body which has been formed by extrusion the high density outer layer siliconises to a layer of impervious silicon carbide and as the body cools there is no way for the excess silicon to escape from the body. The expansion of the trapped silicon in the body as it solidifies on cooling can give rise to forces which will cause the body to crack.

SUMMARY OF THE INVENTION

According to the present invention, a method is provided for the treatment of a body comprising a coherent mixture of finely divided silicon carbide and carbon and containing porosity in the bulk of the body, which body is subsequently to be processed by infiltration with molten silicon, said method of treatment comprising heating the body in the presence of silicon monoxide vapour whereby the silicon monoxide vapour reacts directly with the carbon in the outer layers of the body to provide additional porosity in the outer layers of the body.

Preferably the body is heated to a temperature in the range 1600–1700 degrees centrigrade.

The introduction of additional porosity into the outer layer of the body by the method of the invention results in an increase in the rate of siliconisation of such a body when heated in contact with molten silicon. The method of the invention may be carried out concurrently with a process for siliconisation of the body wherein the body is heated under vacuum in a substantially vertical position with its lower end in contact with molten silicon, which contains a quantity of silica ($SiO_2$), whereby the silicon reacts with the silica to produce silica monoxide vapour which reacts directly with the carbon in the outer layers of the body whilst siliconisation of the body occurs by infiltration of molten silicon up the length of the body from its lower end.

Alternatively, the body may first be suspended above molten silicon containing an addition of silica as described above, whereby the silicon monoxide vapour produced reacts with the carbon in the outer layers of the body, treatment of the body being carried out for a sufficient period of time to allow the production of additional porosity in the outer layers to a required depth and the body then being lowered into contact with the molten silicon for infiltration of the body by the molten silicon.

DESCRIPTION OF THE PREFERRED EMBODIMENTS

The following is an example of the method of the invention as applied to the production of silicon carbide tubing for example of 0.52 inch outside diameter, 0.4 inch bore diameter.

An extrusion mix is prepared by blending α silicon carbide grit with colloidal graphite and a temporary liquid binder. The mix is extruded to give green tubes of the required dimensions which are then heated in air to remove the binder. In the case of a mix containing a carbon weight fraction of 0.33 tubes, for example, of green density 1.625 grams/cm.$^3$ are produced.

The green tubes are then located, approximately vertically, on a ledge above the level of silicon in the base of a graphite crucible. The crucible is heated under vacuum in a high frequency induction furnace. The silicon melts at about 1420° C. and the temperature is allowed to rise to 1600–1700° C. The molten silicon creeps by capillary action up to the ledge on which the green tubes are standing and the silicon rises up through the porosity in the tubes also by capillary action. An exothermic reaction takes place between the silicon and the carbon in the tubes producing beta silicon carbide which bonds the original grains of alpha silicon carbide together. For example, green tubes of density 1.625 grams/cm.$^3$ are converted to dense silicon carbide containing 10 volume percent free silicon. The rate of climb of the molten silicon up the green tubes is dependent on the amount of porosity present in the bulk of the tubes. The amount of porosity which is present in the green tubes is limited by the need to produce a siliconised tube containing not more than 8–12 volume percent free silicon. Hence in the above process the rate of siliconisation of the tube is slow.

In accordance with the invention a quantity of silica ($SiO_2$) is added to the molten silicon in the crucible. The silica reacts with the silicon in accordance with the following equation:

$$Si + SiO_2 \rightarrow 2SiO \text{ (vapour)}$$

The silicon monoxide vapour produced by the above reaction reacts with the carbon in the green tubes at their inner and outer surfaces in accordance with the following equation:

$$SiO + 2C \rightarrow SiC + CO$$

Thus, by the above reaction, half of the carbon at the surface of the green tubes is removed by formation of carbon monoxide and, although the remainder of the carbon is converted to silicon carbide, the overall result is that further porosity is produced in the surface layers of the tubes in addition to the porosity already present in the bulk of the tubes. The highly porous layers formed on the inner and outer surfaces of the green tubes provide a path for the rapid climb of silicon up the tubes so that silicon is supplied much more rapidly to the bulk of the tubes and the rate of siliconisation of the tubes is substantially increased.

A quantity of 15 grams of silica ($SiO_2$) in 200–300 grams of the molten silicon has been found to be a suitable addition.

Evidence of the degree and depth to which increased porosity is produced at the surface of the tubes is shown by the case of a tube which in bulk contained 10 volume percent free silicon after siliconisation, whereas the inner and outer surfaces of the tube, to a depth of 5 microns, contained 38 volume percent free silicon.

In an alternative method in accordance with the invention, the green tubes are first suspended above the level of liquid silicon in the crucible at a temperature of 1600–1700° C. After the tubes have been treated for a period sufficient to achieve the required depth of increased porosity at the surface of the tubes (e.g. 5 microns in depth of increased porosity is produced in one hour), the tubes are lowered onto the ledge in the crucible so that infiltration of the tubes by the molten silicon then proceeds.

The following results give an indication of the effectiveness of the method of the invention in increasing the rate of siliconisation of green tubes. The results relate to green tubes of density 1.625 grams per cm.$^3$ (carbon weight fraction of 0.33), 0.52 inch outside diameter, 0.4 inch bore diameter, and 12 inches in length.

Such tubes when siliconised using silica additions in the molten silicon siliconised to a height of 9¼ inches in 60 minutes and were siliconised over their whole length (12 inches) in 100 minutes. When siliconisation was carried out without silica additions to the molten silicon, the tubes only siliconised to a height of 2 inches in 60 minutes, to 4 inches in 200 minutes, and it was then evident that complete siliconisation of the tubes would take about 30 hours.

I claim:
1. A process for producing a silicon carbide article comprising the steps of:
 (a) forming a coherent body from a mixture of finely divided silicon carbide and carbon, the body having bulk porosity;
 (b) heating the formed body of mixed silicon carbide and carbon in silicon monoxide vapor which reacts directly with the carbon in the outer layers of the body to produce a region in the body of higher porosity than the bulk porosity, the region of higher porosity being in the outer layers of the body;
 (c) heating the body with one end in contact with molten silicon to infiltrate the molten silicon throughout the body via the region of higher porosity and the bulk porosity in the body to convert the carbon in the body to silicon carbide in addition to the silicon carbide already present in the body.

2. A process for producing a silicon carbide article as claimed in claim 1 wherein the body of mixed silicon carbide and carbon is heated in silicon monoxide vapor at a temperature in the range 1600–1700° C.

3. A process for producing a silicon carbide article as claimed in claim 1 wherein steps (b) and (c) of the process are carried out simultaneously by heating the body of mixed silicon carbide and carbon under vacuum in a substantially vertical position with its lower end in contact with molten silicon containing a quantity of silica ($SiO_2$) whereby the silica reacts with the silicon to produce silicon monoxide vapor which reacts directly with the carbon in the outer layers of the body to provide a region of higher porosity in the outer layers of the body while the molten silicon infiltrates the length of the body from its lower end.

4. A process for producing a silicon carbide article as claimed in claim 3 wherein the body is heated to a temperature in the range 1600–1700° C. and 15 grams of silica are provided in each 200–300 grams of the molten silicon.

5. A process for producing a silicon carbide article as claimed in claim 1 wherein step (b) of the process is carried out with the body of mixed silicon carbide and carbon being heated under vacuum while suspended over molten silicon containing a quantity of silica ($SiO_2$) which reacts with the molten silicon to produce silicon monoxide vapor which reacts directly with the carbon in the outer layers of the body to produce a region of higher porosity in the outer layers of the body, stage (c) of the process then being carried out by lowering the body to a substantially vertical position with its lower end in contact with the molten silicon so that the molten silicon infiltrates the body from its lower end.

6. A process for producing a silicon carbide article as claimed in claim 5 wherein the body is heated to a temperature in the range 1600–1700° C. and 15 grams of silica are provided in each 200–300 grams of the molten silicon.

References Cited

UNITED STATES PATENTS

| | | |
|---|---|---|
| 875,673 | 12/1907 | Potter. |
| 992,698 | 5/1911 | Tone. |
| 2,677,627 | 5/1954 | Montgomery et al. |
| 3,205,043 | 9/1965 | Taylor. |
| 3,246,950 | 4/1966 | Gruber. |
| 3,275,722 | 9/1966 | Popper. |
| 3,306,705 | 2/1967 | Leineweber et al. |
| 3,329,527 | 7/1967 | Harris. |
| 3,351,428 | 11/1967 | Campbell et al. |

OSCAR R. VERTIZ, Primary Examiner

G. T. OZAKI, Assistant Examiner

U.S. Cl. X.R.

106—43